April 9, 1963  W. L. SCOTT  3,084,592
PIPETTE CONSTRUCTION
Filed Nov. 20, 1959
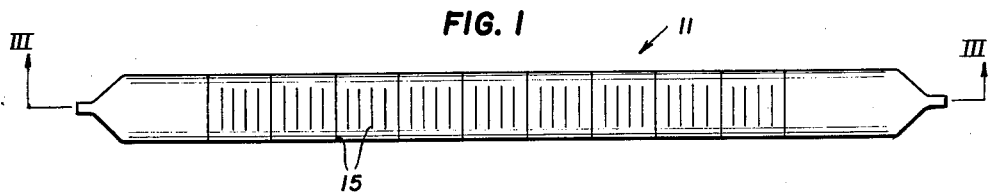
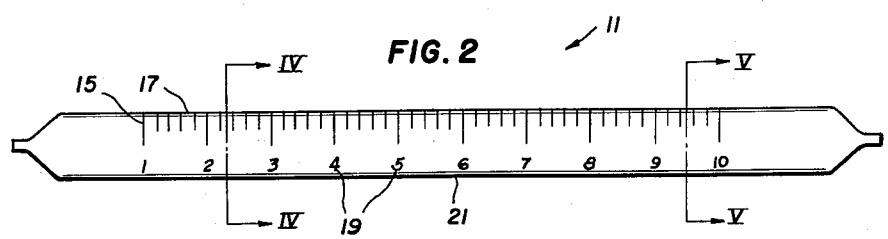
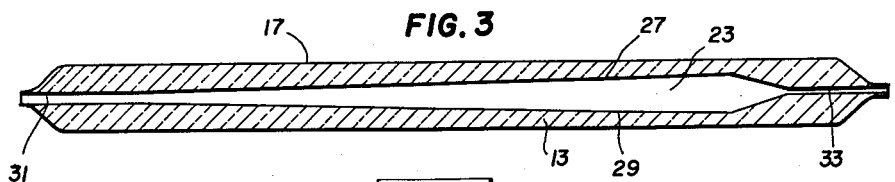
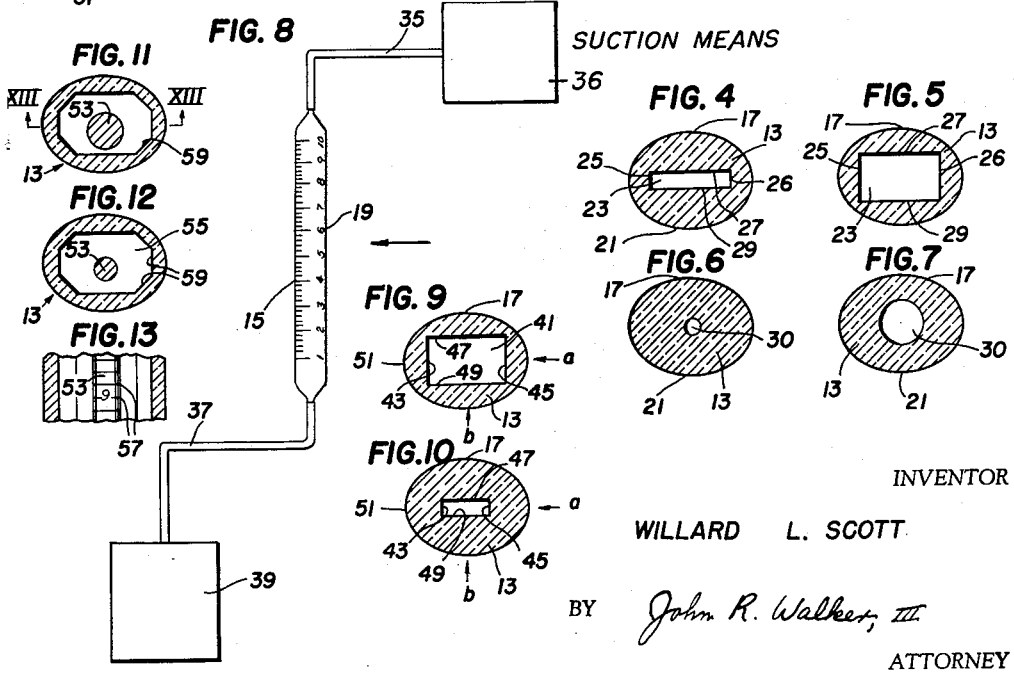
INVENTOR
WILLARD L. SCOTT
BY John R. Walker, III
ATTORNEY

United States Patent Office 3,084,592
Patented Apr. 9, 1963

3,084,592
PIPETTE CONSTRUCTION
Willard L. Scott, 2413 Ardmore Manor, Jackson, Tenn.
Filed Nov. 20, 1959, Ser. No. 854,324
2 Claims. (Cl. 88—14)

This invention relates to a unique pipette construction particularly adapted for measuring the opaqueness, turbidity, density or the like of a liquid.

One of the objects of the present invention is to provide a useful, convenient and efficient pipette with which the opaqueness, turbidity, density, or the like of a liquid is adapted to be measured.

A further object is to provide such a pipette which provides means for measuring the opaqueness and like properties of volatile liquids without having to expose the liquid to the atmosphere.

A further object is to provide means adapted for continuously measuring the opaqueness and like properties of liquids.

A further object is to provide a pipette comprising an elongated body having a chamber extending longitudinally thereof adapted to receive a liquid, said body being provided with calibration marks along the length thereof, said chamber gradually increasing in thickness from adjacent one end to the other, whereby the liquid in said chamber is adapted to cause the light passing therethrough to gradually decrease from adjacent one end of said chamber to the other so that when said marks are viewed through said liquid in said chamber the opaqueness or the like of the liquid is adapted to be determined by noting the point at which the calibration marks disappear behind the liquid.

A further object is to provide such a pipette in which the scale thereof can be changed by turning the pipette to sight through a different portion thereof.

A further object is, generally, to improve the design and construction of pipettes.

The means by which the foregoing and other objects of the present invention are accomplished and the manner of their accomplishment will be readily understood from the following specification upon reference to the accompanying drawings, in which:

FIG. 1 is a plan view of the pipette of the present invention.

FIG. 2 is a side view thereof.

FIG. 3 is a sectional view taken as on the line III—III of FIG. 1.

FIG. 4 is an enlarged sectional view taken as on the line IV—IV of FIG. 2.

FIG. 5 is an enlarged sectional view taken as on the line V—V of FIG. 2.

FIG. 6 is a view similar to FIG. 4 of an alternate shape of the chamber (i.e., conical shape).

FIG. 7 is a view similar to FIG. 5 of said alternate shape of the chamber.

FIG. 8 is an elevational view on a reduced scale showing one way in which the device of the present invention is adapted to be used.

FIG. 9 is a view similar to FIG. 5 of a second alternate shape of the chamber.

FIG. 10 is a view similar to FIG. 4 of the device of FIG. 9.

FIG. 11 is a view similar to FIG. 4 of a third alternate shape of the chamber and an alternate arrangement of the scale.

FIG. 12 is a view similar to FIG. 5 of the device of FIG. 11.

FIG. 13 is a fragmentary sectional view taken as on the line XIII—XIII of FIG. 11.

Referring now to the drawings in which the various parts are indicated by numerals, the pipette 11 of the present invention comprises an elongated transparent body 13 formed of a transparent material as glass, plastic or the like. The cross-sectional exterior outline of the body 13 is preferably oval in shape as shown in the drawing, but may be of any shape without departing from the spirit and scope of the present invention.

Suitable calibration marks 15 are provided in body 13, along the length of the body and spaced apart longitudinally on the top side 17 thereof. The marks 15 are suitably numbered as by the numbers 19 provided preferably adjacent the bottom side 21 of body 13.

Body 13 is provided with an elongated enclosed chamber 23 in the interior thereof which extends longitudinally of the body. The preferred shape of chamber 23 is best shown in FIGS. 3, 4 and 5, wherein it will be seen that the chamber is wedge-shaped so that the vertical thickness gradually increases from adjacent one end (the left end shown in FIG. 3) towards the other end thereof (the right end shown in FIG. 3). Thus, chamber 13 is defined by opposite parallel sides 25, 26 respectively connected adjacent their edges by opposite sides 27, 29 which sides 27, 29 diverge from said left end to the said right end of body 13. Chamber 23 may be alternately in the shape of a cone rather than a wedge as heretofore-described. This conical shaped chamber 30 is shown by the sections in FIGS. 6 and 7, and it will be understood that the section shown in FIG. 6 is taken along the conical chamber at the place corresponding to the section shown in FIG. 4. Similarly, the section shown in FIG. 7 is taken along the conical chamber at the place corresponding to the section shown in FIG. 5. It will be understood, that when a conical shaped chamber 30 is used the calibration marks 15 may be located on any side of the body 13.

Body 13 is provided with a passage 31 communicating at one end with one end of chamber 23 and opening outwardly therefrom. Another passage 33 is communicated adjacent one end with the other end of chamber 23 and opens outwardly therefrom. From the foregoing, it will be understood that passages 31, 33 provide the means for introducing liquid into chamber 23 to fill the chamber and also provide the means for draining the chamber.

To use pipette 11, chamber 23 is filled with liquid in the usual manner. Thus, a tube 35 may be placed on one end of the pipette as shown in FIG. 8 and a suction from a source, indicated diagrammatically as at 36, is applied thereto. The opposite end of the pipette may be provided with another tube 37 which leads through an aperture to the interior of the closed container 39, which contains the liquid. Thus, with the apparatus hereinabove described and as shown in FIG. 8, a volatile liquid may be kept covered so that it is not exposed to the atmosphere. The pipette 11 may be used in other ways, if desired. As for example, the tube 37 may be omitted and the lower end of the pipette simply placed in the liquid in the usual manner so that the liquid can be drawn into chamber 23. Also, the liquid may be pumped into or through chamber 23 rather than being drawn therein. In reading the amount of opaqueness, turbidity, density or the like, the user of the pipette 11 looks through the body 13 of the pipette from the direction shown by the arrow in FIG. 8 and views the calibration marks 15 through the liquid. It will be understood that the increasing thickness of the chamber 23 from the bottom to the top, as viewed in FIG. 8, will cause the calibration marks 15 to appear less distinct in appearance as the viewer sights closer to the top. The reading is taken of the calibration marks at the point at which the calibration marks disappear behind the liquid.

It will be understood from the foregoing that continuous readings may be taken as the liquid flows through chamber 23. Of course, the device may be used to take specific samples of a liquid rather than continuously as above-described. Also, it will be understood that the thickness of chamber 23 should be of such a degree to conform to the type of specific material to be tested. For example, dark dense solutions would require a thin wedge-like chamber or a thin conical chamber, whereas light, less dense solutions would require a thicker chamber to make readings.

A second alternate arrangement of the pipette is shown in FIGS. 9 and 10 in which the chamber is in the shape of a pyramid. Thus, chamber 41 is defined by opposite diverging sides 43, 45 respectively connected adjacent their edges by opposite diverging sides 47, 49. It will be noted that the sections through chamber 41 define a rectangle with the sides 47, 49 being longer than sides 43, 45. In addition to the calibration marks 15 being disposed along side 17, as in the preferred embodiment, a second set of calibration marks are disposed along side 51 of the pipette in a similar manner to marks 15. Other than the shape of chamber 41 and the additional marks along side 51 the pipette is constructed in the same manner as previously described for the preferred embodiment. This second alternate arrangement possesses the important advantage of being adapted to have the scales thereof shifted simply by either turning body 13 ninety degrees or the observer shifting his line of sight ninety degrees. Thus, for example, assume that continuous readings of density are being taken by viewing marks 15 from the direction shown by the arrow at "b" in FIGS. 9 and 10. Next, assume that the liquid becomes less dense until readings can no longer be taken. Then, it is only necessary for the observer to turn the body 13 until he views the marks on side 51 from the direction shown by the arrow at "a" in FIGS. 9 and 10. From the foregoing, it will be understood that the thickness of chamber 41 increases from a minimum when viewed from "b" at the end adjacent the section of FIG. 10 towards the end adjacent the section of FIG. 9, and continues to increase from the end adjacent the section of FIG. 10, as viewed from "a" to a maximum at the end adjacent the section of FIG. 9, as viewed from "a." Thus, the calibration marks along side 51 form a continuation of marks 15. Also, from the foregoing, it will be understood that without the double scale above-described, it would have been necessary in the example given to change pipettes, which would have been troublesome and would have interrupted the continuity of the readings.

In the third alternate arrangement shown in FIGS. 11, 12 and 13, the variation in the effective chamber thickness between the viewer and the calibration marks is accomplished by providing a conically-shaped post 53 mounted in the chamber 55 of body 13 and spaced from the sides defining the chamber. Post 53 is preferably white and opaque with calibration marks 57 provided along the length thereof. Chamber 55 is defined by a plurality of sides 59 interconnected adjacent their edges so that the chamber is in the shape of a polygon in cross section. Post 53 is preferably offset from the center of chamber 55 so that a plurality of scales are provided by viewing the marks 57 through the various sides 59, which provides various effective thicknesses of chamber 55 between the respective sides 59 and marks 57.

From the foregoing, it will be understood that a very useful, convenient and efficient pipette is provided which not only can perform the usual functions of a pipette but with which the opaqueness, turbidity, density or the like of a liquid is adapted to be measured.

Although the invention has been described and illustrated with respect to a preferred embodiment thereof, it is to be understood that it is not to be so limited since changes and modifications may be made therein which are within the full intended scope of this invention as hereinafter claimed.

I claim:
1. A pipette comprising an enlongated transparent body, said body being provided with a plurality of interior sides defining an elongated enclosed chamber in the interior thereof extending substantially the length thereof, said body being provided with an outwardly opening passage adjacent one end thereof communicating with one end of said chamber and being provided with another outwardly opening passage adjacent the other end thereof communicating with the other end of said chamber whereby liquid is admitted to said chamber, said body including a post mounted in said chamber and having calibration marks thereon, said chamber between said sides and said post gradually increasing in thickness from adjacent one end to the other whereby when said marks are viewed through said liquid in said chamber the opaqueness, turbidity, density and like characteristics of the liquid are determined by noting the point at which the calibration marks disappear behind the liquid, said post being conical and offset from the center of said chamber to establish a plurality of scales when said calibration marks are viewed through said plurality of sides.

2. A pipette comprising an elongated transparent body, said body including a plurality of interior sides interconnected adjacent the edges thereof to define a chamber of polygonal shape in cross section, said body being provided with an outwardly opening pasage adjacent one end thereof communicating with one end of said chamber and being provided with another outwardly open passage adjacent the other end thereof communicating with the other end of said chamber whereby liquid is admitted to said chamber, said body including a post mounted in said chamber and having calibration marks thereon, said chamber between each of said sides and said post gradually increasing in thickness from adjacent one end to the other whereby when said marks are viewed through said liquid in said chamber the opaqueness, turbidity, density and like characteristics of the liquid are determined by noting the point at which the calibration marks disappear behind the liquid, at least two of said sides being spaced at different distances from said post whereby at least a pair of scales are provided by viewing said calibration marks selectively through said two of said sides.

References Cited in the file of this patent
UNITED STATES PATENTS

| | | |
|---|---|---|
| 1,681,339 | Hall | Aug. 21, 1928 |
| 2,050,608 | Hellige | Aug. 11, 1936 |
| 2,487,238 | Hallerberg | Nov. 8, 1949 |
| 2,595,082 | Kertesz | Apr. 29, 1952 |
| 2,688,629 | Wadley et al. | Sept. 7, 1954 |
| 2,779,232 | Small | Jan. 29, 1957 |
| 2,835,412 | Clurman | May 20, 1958 |

FOREIGN PATENTS

| | | |
|---|---|---|
| 500,892 | Great Britain | Feb. 17, 1939 |